United States Patent
Lin et al.

(10) Patent No.: US 11,269,534 B2
(45) Date of Patent: Mar. 8, 2022

(54) DATA STORAGE DEVICE AND NON-VOLATILE MEMORY CONTROL METHOD

(71) Applicant: Silicon Motion, Inc., Jhubei (TW)

(72) Inventors: Hsuan-Ping Lin, Taichung (TW); Jie-Hao Lee, Zhubei (TW); Jen-Hung Liao, Zhubei (TW)

(73) Assignee: SILICON MOTION, INC., Jhubei (TW)

( * ) Notice: Subject to any disclaimer, the term of this patent is extended or adjusted under 35 U.S.C. 154(b) by 0 days.

(21) Appl. No.: 16/902,475

(22) Filed: Jun. 16, 2020

(65) Prior Publication Data

US 2021/0089223 A1  Mar. 25, 2021

(30) Foreign Application Priority Data

Sep. 19, 2019  (TW) .................................. 108133729

(51) Int. Cl.
*G06F 3/06* (2006.01)

(52) U.S. Cl.
CPC .......... *G06F 3/0644* (2013.01); *G06F 3/0604* (2013.01); *G06F 3/064* (2013.01); *G06F 3/0659* (2013.01); *G06F 3/0679* (2013.01)

(58) Field of Classification Search
CPC .... G06F 3/0644; G06F 3/0604; G06F 3/0679; G06F 3/0659; G06F 3/064
See application file for complete search history.

(56) References Cited

U.S. PATENT DOCUMENTS

| | | | | |
|---|---|---|---|---|
| 2010/0318726 | A1* | 12/2010 | Watanabe | G06F 12/0246 711/103 |
| 2011/0099326 | A1* | 4/2011 | Jung | G06F 3/0613 711/103 |
| 2013/0282955 | A1* | 10/2013 | Parker | G06F 12/0246 711/103 |
| 2015/0095292 | A1* | 4/2015 | Dryfoos | G06F 16/1724 707/693 |
| 2017/0300249 | A1* | 10/2017 | Geml | G06F 3/0619 |
| 2019/0220396 | A1 | 7/2019 | Lin | |
| 2020/0081646 | A1* | 3/2020 | Byun | G06F 3/0608 |
| 2020/0226064 | A1* | 7/2020 | Ramamurthy | G06F 12/1036 |
| 2020/0409840 | A1* | 12/2020 | Pu | G06F 3/0679 |

* cited by examiner

*Primary Examiner* — David Yi
*Assistant Examiner* — Trung-Hao Joseph Nguyen
(74) *Attorney, Agent, or Firm* — McClure, Qualey & Rodack, LLP (57) ABSTRACT

An efficient control technology for non-volatile memory is shown. A controller selects the main source block from the non-volatile memory, wherein the main source block has a logical group amount exceeding a threshold amount. The controller selects a target logical group from the main source block, and collects data of the target logical group to a destination block provided by the non-volatile memory to reduce the logical group amount of the main source block.

16 Claims, 5 Drawing Sheets

DATA STORAGE DEVICE AND NON-VOLATILE MEMORY CONTROL METHOD

CROSS REFERENCE TO RELATED APPLICATIONS

This Application claims priority of Taiwan Patent Application No. 108133729, filed on Sep. 19, 2019, the entirety of which is incorporated by reference herein.

BACKGROUND OF THE INVENTION

Field of the Invention

The present invention is related to non-volatile memory control technologies.

Description of the Related Art

There are various forms of non-volatile memory (NVM) for long-term data storage, such as flash memory, magnetoresistive random access memory (magnetoresistive RAM), ferroelectric RAM, resistive RAM, spin transfer torque-RAM (STT-RAM), and so on. These types of non-volatile memory may be used as the storage medium in a data storage device.

Non-volatile memory usually has special storage characteristics. In this technical field, control technologies based on the special storage characteristics of non-volatile memory are developed.

BRIEF SUMMARY OF THE INVENTION

An efficient control technology for non-volatile memory is proposed in the invention.

A data storage device in accordance with an exemplary embodiment of the present invention has a non-volatile memory and a controller configured to control the non-volatile memory. The controller selects the main source block from the non-volatile memory, wherein the main source block has a logical group amount exceeding a threshold amount. The controller selects a target logical group from a plurality of logical groups of data stored in the main source block and collects data of the target logical group to a destination block of the non-volatile memory to reduce the logical group amount of the main source block.

In an exemplary embodiment, in addition to collecting data of the target logical group from the main source block to the destination block, the controller further collects data of the target logical group from the other blocks of the non-volatile memory to the destination block for data rearrangement of the target logical group.

In an exemplary embodiment, the controller repeats data rearrangement of several logical groups related to the main source block until the logical group amount of the main source block is reduced to not exceeding the threshold amount.

In an exemplary embodiment, the controller performs the data rearrangement when not operating in response to a host.

In an exemplary embodiment, the controller dynamically increases the threshold amount in response to frequent use of the data storage device.

In an exemplary embodiment, the controller loads a target sub table corresponding to the target logical group from the non-volatile memory to a temporary storage. According to the target sub table loaded in the temporary storage, the controller moves all valid data of the target logical group to the destination block. The controller updates the target sub table in the temporary storage to map the target logical group to the destination block and then stores the updated target sub table back to the non-volatile memory.

In an exemplary embodiment, the controller takes a logical group having the largest amount of data in the main source block as the target logical group.

In an exemplary embodiment, the controller programs write data issued by a host to an active block of the non-volatile memory and calculates a logical group amount of the active block. When closing the active block, the controller determines whether the logical group amount of the active block is greater than the threshold amount. When determining that the logical group amount of the active block is greater than the threshold amount, the controller regards the closed active block as the main source block.

The aforementioned controller may be implemented in other architectures. The foregoing concept can be used to implement a non-volatile memory control method.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows exemplary embodiments of carrying out the invention. This description is made for the purpose of illustrating the general principles of the invention and should not be taken in a limiting sense. The scope of the invention is best determined by reference to the appended claims.

A non-volatile memory for long-term data retention may be a flash memory, a magnetoresistive random access memory (magnetoresistive RAM), a ferroelectric RAM, a resistive RAM, a spin transfer torque-RAM (STT-RAM) and so on. The following discussion uses flash memory as an example.

Today's data storage devices often use flash memory as the storage medium for storing user data from the host. There are many types of data storage devices, including memory cards, universal serial bus (USB) flash devices, solid-state drives (SSDs), and so on. In another exemplary embodiment, a flash memory may be packaged with a controller to form a multiple-chip package called eMMC (embedded multimedia card).

A data storage device using a flash memory as a storage medium can be applied in a variety of electronic devices, including a smartphone, a wearable device, a tablet computer, a virtual reality device, etc. A calculation module of an electronic device may be regarded as a host that operates the data storage device equipped on the electronic device to access the flash memory within the data storage device.

A data center may be built with data storage devices using flash memories as the storage medium. For example, a server may operate an array of SSDs to form a data center. The server may be regarded as a host that operates the SSDs to access the flash memories within the SSDs.

Flash memory has its special storage characteristics which are described below.

The host side distinguishes data by logical addresses (for example, logical block addresses LBAs or global host pages GHPs). As for where the data is actually stored in the flash memory, it is managed by mapping information.

Figure 1:
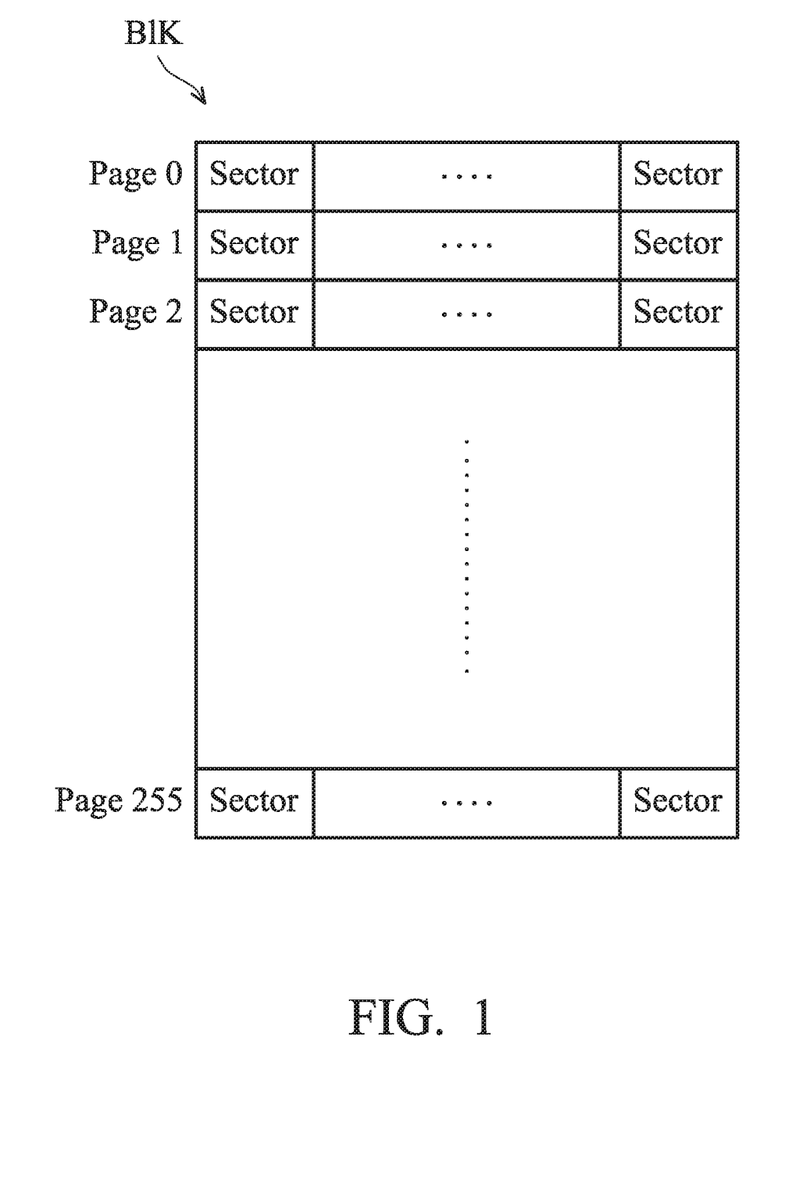
FIG. 1 illustrates the architecture of one block BLK.

The physical space of a flash memory is divided into a plurality of blocks. FIG. 1 illustrates the architecture of one block BLK, which includes a plurality of pages (e.g., page 0 to page 255). One implementation is to sequentially program a block according to the page number (from low to high). Each page includes a plurality of sectors (e.g., 32 sectors per page), and each sector may store 512 B user data. A single write may cover multiple sectors. In a 4 KB data management mode, each data unit covers 8 sectors (4 KB) and the 8 sectors are managed together. A 16 KB page stores four data units (32 sectors). The four data units may be discontinuous in logical.

In particular, data is not updated to the storage space of the old data. The new version of the data must be written into a spare space and the old data is invalidated. A block may only have sporadic valid data remained. The storage space of flash memory needs to be erased before being used again. As the spare blocks are gradually consumed, the number of spare blocks is reduced. When the spare blocks is insufficient (for example, less than a threshold amount), a garbage collection demand occurs. Sporadic valid data in a block is collected into another block through garbage collection. Blocks with only invalid data remained is erased to be released as a spare block, and so that the number of spare blocks is increased to ensure the normal use of the data storage device. Garbage collection, however, may result in random storage in the same block.

As can be seen from the foregoing, mapping information may be complex and the management of mapping information will significantly affect the flash memory control performance. In an exemplary embodiment, a logical-to-physical (L2P) mapping table is established to map logical addresses used at the host side to the physical space of the flash memory. The size of the L2P mapping table is huge and is divided into sub tables L2P_G # to correspond to the different logical groups G #. For example, the whole L2P mapping table may be divided into 2048 sub tables L2P_G0~L2P_G2047. Instead of loading the whole L2P mapping table, only the sub table L2P_G # corresponding to the logical group G # of the data to be accessed is loaded as a reference, which results in fast access and convenient management of mapping information.

Figure 2:
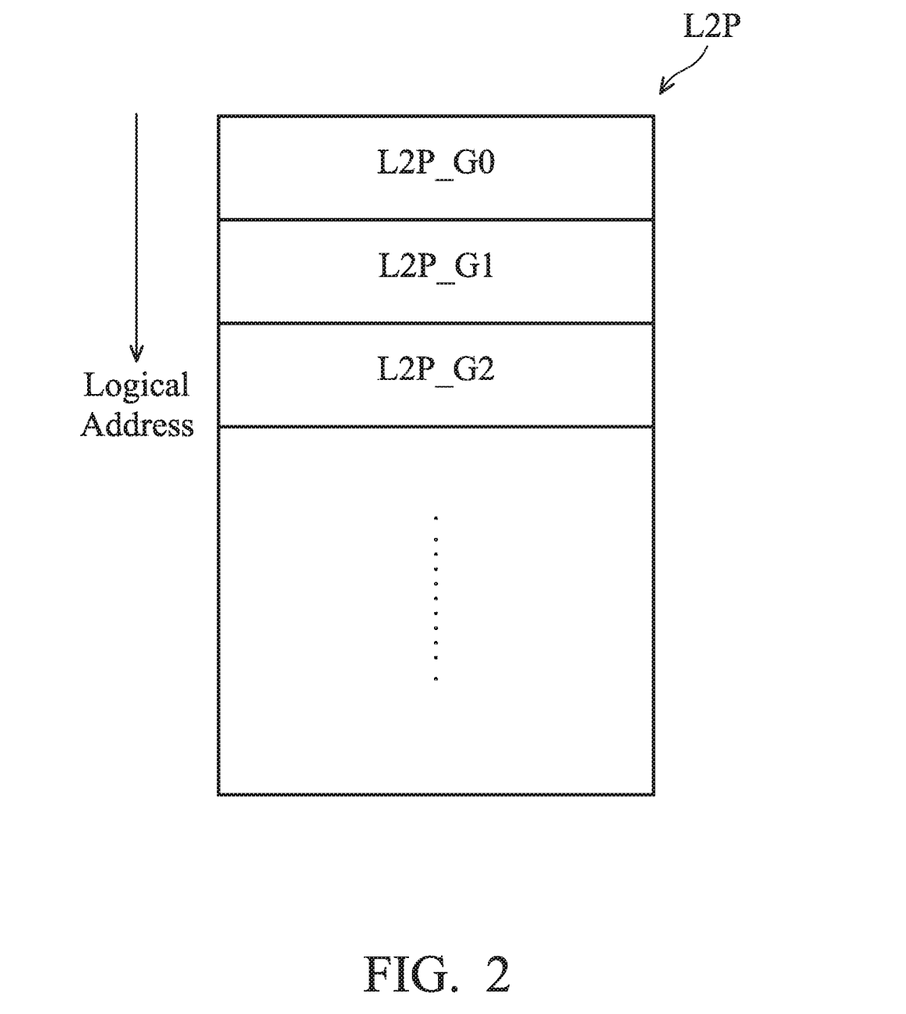
FIG. 2 illustrates how to define the sub tables L2P_G #.

FIG. 2 illustrates how to define the sub tables L2P_G #. In an exemplary embodiment, the L2P mapping table is divided according to a fixed length of logical address. In an exemplary embodiment, the L2P mapping table is divided every 1024 LBAs (logical block addresses). From LBA #0 to LBA #1023 (i.e., logical group G #0), the corresponding physical addresses may be listed in a sub table L2P_G #0. From LBA #1024 to LBA #2047 (i.e., logical group G #1), the corresponding physical addresses may be listed in a sub table L2P_G #1. Each physical address may be 4 B, for example.

In the most ideal case, data is stored in the data blocks in the order of the logical groups G #. For example, data block #0 stores data of logical groups G #0 and G #1 (i.e., corresponding to sub tables L2P_G #0 and L2P_G #1), data block #1 stores data of logical groups G #2 and G #3 (i.e., corresponding to sub tables L2P_G #2 and L2P_G #3), and so on. The number of sub tables L2P_G # related to each data block is limited and garbage collection can be easily performed. However, in the actual situation, data is not stored in the data blocks in the order of the logical groups G #. One data block may store data corresponding to a considerable number of sub tables L2P_G #. For example, one single data block may randomly store data corresponding to 1024 sub tables L2P_G #0 to L2P_G #1023. A lot of system resources and time may be consumed in garbage collection of such a data block because there are 1024 sub tables need to be loaded and updated.

In order to solve the above problems and increase the efficiency of the garbage collection, a data rearrangement technique is shown in the present invention. Monitoring of the number of sub tables L2P_G # (i.e., a logical group amount) related to the data stored in each data block is required. The number of sub tables L2P_G # related to one data block is reduced by moving data corresponding to some sub tables L2P_G # to another block. In this manner, the number of sub tables L2P_G # related to each data block is limited and less resource is consumed in loading and updating the sub tables L2P_G # during garbage collection. The efficiency of garbage collection is improved.

Figure 3:
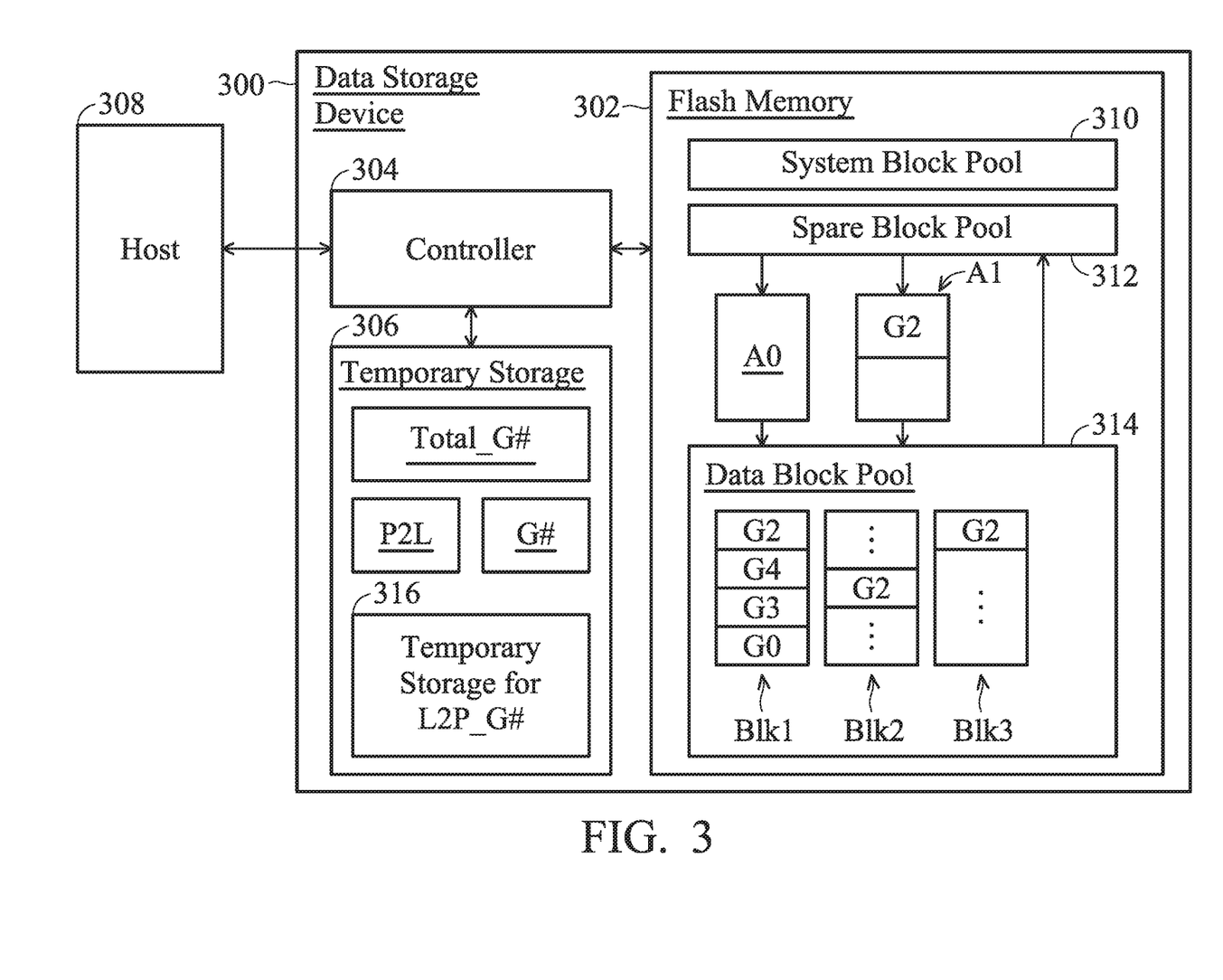
FIG. 3 is a block diagram illustrating a data storage device 300 in accordance with an exemplary embodiment of the present invention.

FIG. 3 is a block diagram illustrating a data storage device 300 in accordance with an exemplary embodiment of the present invention, which includes a flash memory 302, a controller 304, and a temporary storage 306. A host 308 operates the flash memory 302 through the controller 304. The controller 304 may be further responsible for the optimization of storage of the flash memory 302 without instructions from the host 308. When performing calculations, the controller 304 uses the temporary storage 306. The temporary storage 306 may be a dynamic random access memory (DRAM) or a static random access memory (SRAM).

The blocks in the flash memory 302 can be given different names according to their usages. For example, an empty block may be called a spare block, a currently-programmed block may be called an active block, and a full block may be called a data block. There may be a system block pool 310 containing system information blocks storing all sub tables L2P_G #. A spare block may be selected from the spare block pool 312 to be used as an active block A0 for the programming of user data requested through he write commands from the host 308. Corresponding to the physical space usage of the active block A0, the controller 304 manages a physical-to-logical (P2L) mapping table on the temporary storage 306. The logical addresses of data stored in the physical space of the active block A0 are recorded in the P2L mapping table. The P2L mapping table maps the physical addresses to logical addresses. The controller 304 may update the L2P mapping table based on the P2L mapping table. The controller 304 may push the active block A0 to a data block pool 314 as a data block after programming the P2L mapping table to the active block A0 (e.g., programmed to the active block A0 as end of block, EOB, information). Based on the P2L mapping table or real-time information managed during the programming of the active block A0, the controller 304 may obtain the logical groups G # or a logical group amount Total_G # of the block (no matter it is a data block or the active block A0). In an exemplary embodiment, when closing an active block A0, the related logical groups G # or the logical group amount Total_G # of the active block A0 may be programmed to the active block A0 as the EOB information.

The controller 304 may periodically or aperiodically checks the logical group amount Total_G # of each data block to trigger the data rearrangement. When any data block has a logical group amount Total_G # greater than a threshold amount, the controller 304 selects a target sub table L2P_G # for data rearrangement. Referring to FIG. 3, the logical group amount Total_G # of the data block BLK #1 is 4, greater than 3, the threshold amount. The controller 304 selects a target sub table, e.g., L2P_G #2, according to the data stored in the data block BLK #1. The controller 304 collects the data managed by the target sub table L2P_G #2 (as shown, scattered over the data blocks Blk #1, Blk #2, and Blk #3 and the active block A0) to another active block A1. Accordingly, the data corresponding to the logical group G #2 in the data block Blk #1 is invalidated. The logical group amount Total_G # of the data block BLK #1 is reduced to 3, no longer greater than the threshold amount. In another example wherein the original logical group amount Total_G # of the data block BLK #1 is much greater than 3, the controller 304 can repeat the data rearrangement for several target sub tables. In an exemplary embodiment, the data arrangement of more than one target sub table is performed together. For example, L2P_G #2-#3 are selected as the target sub tables, and the controller 304 performs the data arrangement of the several target sub tables L2P_G #2-#3 together. In this manner, the logical group amount Total_G # of the data block BLK #1 is reduced rapidly to be lower than the threshold amount. Since the active block A1 collects complete data of each logical group G #, the logical group amount Total_G # of the active block A1 is limited and must be less than the threshold amount. When being full of data, the active block A1 with limited logical group amount Total_G # is pushed into the data block pool 314 as a data block.

In an exemplary embodiment, data in the storage is rearranged in background to limit the number of logical groups related to each data block. For example, after pushing an active block A0 into the data block pool as a new data block, the controller 304 may utilize the free time to rearrange the data in the new data block. In such a design, it is not necessary to monitor the logical group amount Total_G # of every block. The controller 304 may monitor the logical group amount Total_G # on just the active block A0 and a few data blocks that have just been pushed into the data block pool 314 and have not been rearranged yet. There is no need to record the logical group amount Total_G # as end of block (EOB) information in each data block.

Using this data rearrangement, data managed by the same sub table L2P_G # is collected in the same data block. Thus, sequential reads (to read data of continuous logical addresses) can be responded to rapidly. The reading efficiency of the data storage device 300 is improved. When the data block Blk #1 with the reduced logical group amount Total_G # is the source block for garbage collection, just a few sub tables L2P_G # need to be updated. Garbage collection can be executed and completed quickly.

The threshold amount may be a fixed value or a non-fixed value. Over time, the number of sub tables L2P_G # related to each data block may gradually increase. Using a fixed threshold amount may not meet the actual needs of the user, or cause significant write amplification. Therefore, the controller 304 may add a variable value to a fixed threshold amount and thereby a non-fixed threshold amount is provided. The non-fixed threshold amount may be the average logical group amount of all data blocks, which meets the actual needs.

Figure 4:
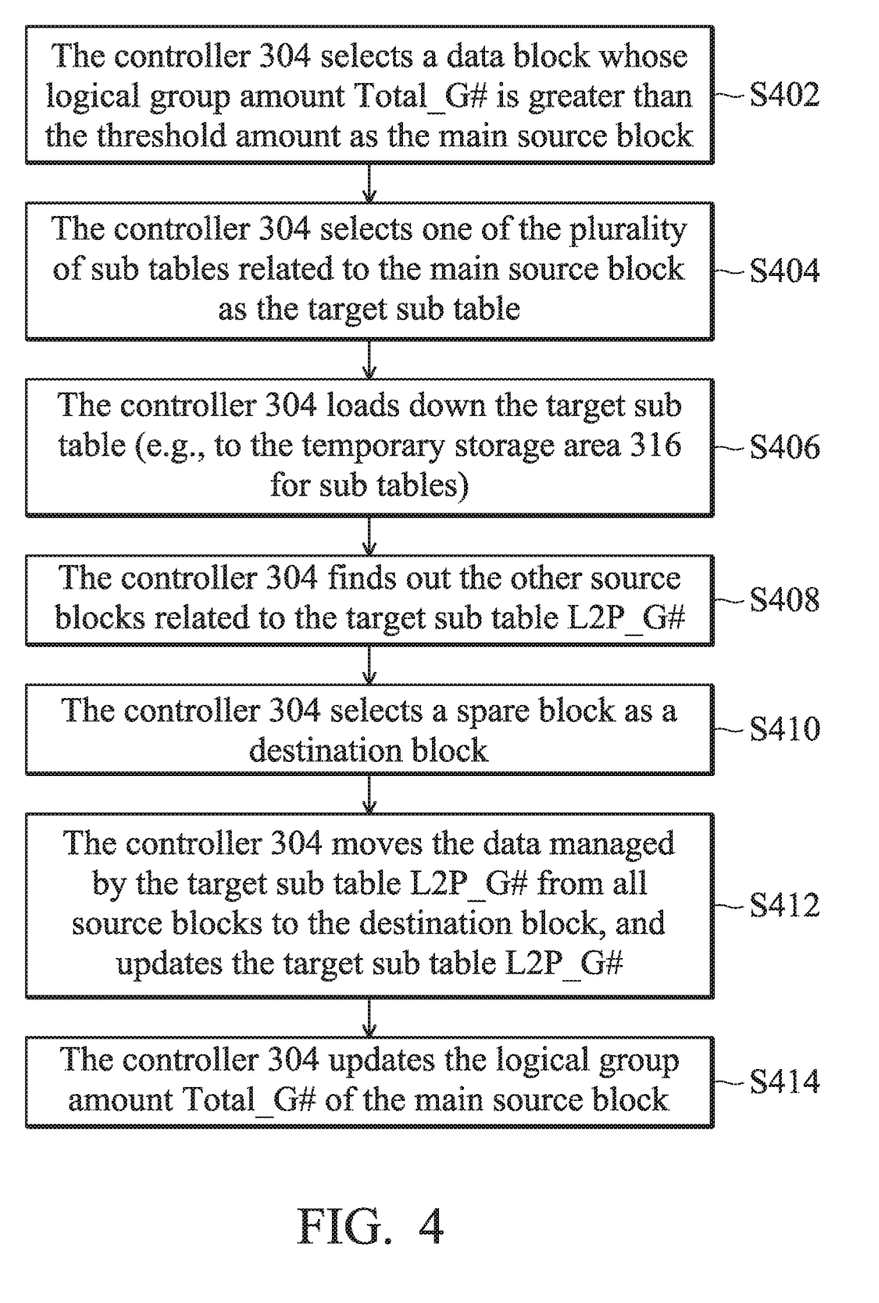
FIG. 4 is a flowchart depicting the data rearrangement in accordance with an exemplary embodiment of the present invention.

FIG. 4 is a flowchart depicting the data rearrangement in accordance with an exemplary embodiment of the present invention. The data rearrangement may be performed by the controller 304 of the data storage device 300.

In step S402, the controller 304 selects a data block whose logical group amount Total_G # is greater than the threshold amount as the main source block. The controller 304 may record and update the logical groups G # related to each data block, and periodically or aperiodically checks whether any data block has a logical group amount Total_G # greater than the threshold amount. Taking FIG. 3 as an example, the data stored in the data block BLK #1 relates to sub tables L2P_G #0, #2, #3, and #4. The logical group amount Total_G # of the data block BLK #1 is 4, which is greater than the threshold amount 3. Therefore, the controller 304 selects the data block BLK #1 as the main source block. In an exemplary embodiment, the controller 304 selects the first data block having a logical group amount Total_G # greater than the threshold amount as the main source block. In another exemplary embodiment, the controller 304 selects the data block having the maximum logical group amount Total_G # as the main source block. In another exemplary embodiment, the controller 304 selects the latest (or the oldest) data block having a logical group amount Total_G # greater than the threshold as the main source block.

In step S404, the controller 304 selects one of the plurality of sub tables related to the main source block as the target sub table. For example, the controller 304 selects the sub table L2P_G #2 as the target sub table. The controller 304 may select the first or last sub table related to the main source block as the target sub table. In another exemplary embodiment, the controller 304 selects the sub table corresponding to the most or the least amount of valid data in the main source block as the target sub table.

In step S406, the controller 304 loads down the target sub table (e.g., to the temporary storage area 316 for sub tables). For example, the controller 304 reads the system blocks of the system block pool 310 to load the sub table L2P_G #2 corresponding to the logical group G #2.

In step S408, the controller 304 finds out the other source blocks related to the target sub table L2P_G #. For example, when the target sub table is L2P_G #2, the controller 304 looks up the target sub-table L2P_G #2 and thereby learns the physical locations of the data of the logical group G #2. As shown, in addition to the data block BLK #1, the sub table L2P_G #2 maps some data of the logical group G #2 to the data blocks BLK #2 and BLK #3, so that the controller 304 further selects the data blocks BLK #2 and block BLK #3 as source blocks.

In step S410, the controller 304 selects a spare block as a destination block. The controller 304 selects one spare block from the spare block pool 312 as an active block A1, which is the destination block for data rearrangement. In another exemplary embodiment, the controller 304 selects the active block A0 as the destination block.

In step S412, the controller 304 moves the data managed by the target sub table L2P_G # from all source blocks to the destination block, and updates the target sub table L2P_G #. For example, according to the physical addresses listed in the sub table L2P_G #2, the controller 304 moves data of the logical group G #2 from the main source block BLK #1 and the other source blocks BLK #2 and BLK #3 to the active block A1, and then updates the sub table L2P_G # by the physical-to-logical mapping table P2L of the active block A1. The controller 304 may collect data to the active block A1 in the order of the physical addresses listed in the sub table L2P_G #2. In another exemplary embodiment, the controller 304 first obtains the physical addresses of the main source block from the sub table L2P_G #2 and moves data of logical group G #2 from the main source block BLK #1 to the active block A1. Later, the controller 304 obtains physical addresses of the other source blocks BLK #2 and BLK #3 and, according to the obtained physical addresses, moves data of the logical group G #2 from the other source blocks BLK #2 and BLK #3 to the active block A1.

In step S414, the controller 304 updates the logical group amount Total_G # of the main source block.

When the logical group amount Total_G # of the main source block is still greater than the threshold amount, the data rearrangement is repeated to reduce the logical group amount Total_G # of the main source block. In an exemplary embodiment, more than one sub tables are loaded in step S406 and the data rearrangement of the loaded sub tables are performed together. In this manner, the logical group amount Total_G # of the main source block reduced rapidly.

Figure 5:
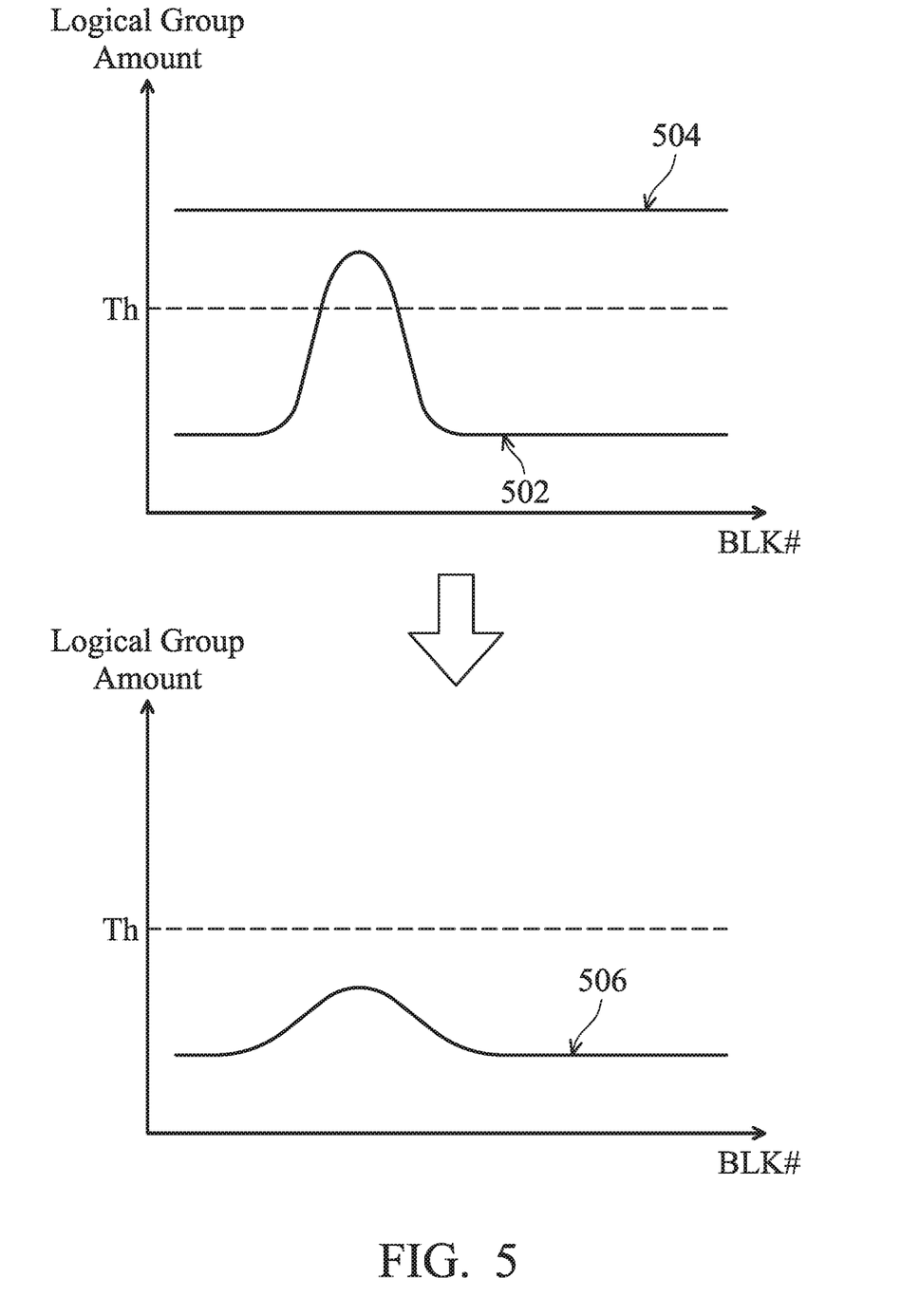
FIG. 5 shows the improvement of the data rearrangement in accordance with an exemplary embodiment of the present invention.

FIG. 5 shows the improvement of the data rearrangement in accordance with an exemplary embodiment of the present invention. Curve 502 outlines the logical group amount Total_G # of each data block, and shows that some data blocks have the logical group amount Total_G # greater than the threshold amount Th. Curve 504 shows that after garbage collection the logical group amount Total_G # of every data block dramatically grows. However, using the data rearrangement of the present invention, the logical group amount Total_G # exceeding the threshold amount Th in curve 502 is significantly reduced to less than or equal to the threshold amount Th as shown by curve 506.

The memory controller 304 controlling the flash memory 302 may be implemented in other architectures. Any technology that limits the logical group amount Total_G # of each block based on the aforementioned concept belongs to the scope of protection in this case. In some exemplary embodiments, control methods for non-volatile memory may be realized based on the foregoing concept.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory; and
a controller, configured to control the non-volatile memory,
wherein:
the controller selects a main source block from the non-volatile memory, wherein the main source block has a logical group amount exceeding a threshold amount and the logical group amount shows how much logical groups related to data stored in the main source block; and
the controller selects a target logical group from a plurality of logical groups of data stored in the main source block and collects data of the target logical group to a destination block of the non-volatile memory to reduce the logical group amount of the main source block.

2. The data storage device as claimed in claim 1, wherein:
in addition to collecting data of the target logical group from the main source block to the destination block, the controller further collects data of the target logical group from the other blocks of the non-volatile memory to the destination block for data rearrangement of the target logical group.

3. The data storage device as claimed in claim 2, wherein:
the controller repeats data rearrangement of several logical groups related to the main source block until the logical group amount of the main source block is reduced to not exceeding the threshold amount.

4. The data storage device as claimed in claim 3, wherein:
the controller performs the data rearrangement when not operating in response to a host.

5. The data storage device as claimed in claim 3, wherein:
the controller dynamically increases the threshold amount in response to frequent use of the data storage device.

6. The data storage device as claimed in claim 1, wherein:
the controller loads a target sub table corresponding to the target logical group from the non-volatile memory to a temporary storage;
according to the target sub table loaded in the temporary storage, the controller moves all valid data of the target logical group to the destination block; and
the controller updates the target sub table in the temporary storage to map the target logical group to the destination block and then stores the updated target sub table back to the non-volatile memory.

7. The data storage device as claimed in claim 1, wherein:
the controller takes a logical group having the largest amount of data in the main source block as the target logical group.

8. The data storage device as claimed in claim 1, wherein:
the controller programs write data issued by a host to an active block of the non-volatile memory and calculates a logical group amount of the active block;
when closing the active block, the controller determines whether the logical group amount of the active block is greater than the threshold amount; and
when determining that the logical group amount of the active block is greater than the threshold amount, the controller regards the closed active block as the main source block.

9. A non-volatile memory control method, comprising:
selecting a main source block from a non-volatile memory, wherein the main source block has a logical group amount exceeding a threshold amount and the logical group amount shows how much logical groups related to data stored in the main source block; and
selecting a target logical group from a plurality of logical groups of data stored in the main source block, and collecting data of the target logical group to a destination block of the non-volatile memory to reduce the logical group amount of the main source block.

10. The non-volatile memory control method as claimed in claim 9, further comprising:
in addition to collecting data of the target logical group from the main source block to the destination block, further collecting data of the target logical group from the other blocks of the non-volatile memory to the destination block for data rearrangement of the target logical group.

11. The non-volatile memory control method as claimed in claim 10, further comprising:

repeating data rearrangement of several logical groups related to the main source block until the logical group amount of the main source block is reduced to not exceeding the threshold amount.

12. The non-volatile memory control method as claimed in claim 11, wherein when not operating in response to a host, the data rearrangement is performed.

13. The non-volatile memory control method as claimed in claim 11, further comprising:

dynamically increasing the threshold amount in response to frequent use of the non-volatile memory.

14. The non-volatile memory control method as claimed in claim 9, further comprising:

loading a target sub table corresponding to the target logical group from the non-volatile memory to a temporary storage;

according to the target sub table loaded in the temporary storage, moving all valid data of the target logical group to the destination block; and updating the target sub table in the temporary storage to map the target logical group to the destination block and then storing the updated target sub table back to the non-volatile memory.

15. The non-volatile memory control method as claimed in claim 9, wherein:

a logical group having the largest amount of data in the main source block is regarded as the target logical group.

16. The non-volatile memory control method as claimed in claim 9, further comprising:

programming write data issued by a host to an active block of the non-volatile memory and calculating a logical group amount of the active block;

when closing the active block, determining whether the logical group amount of the active block is greater than the threshold amount; and when determining that the logical group amount of the active block is greater than the threshold amount, regarding the closed active block as the main source block.

* * * * *